(12) United States Patent
Wang et al.

(10) Patent No.: US 11,012,740 B2
(45) Date of Patent: May 18, 2021

(54) METHOD, DEVICE, AND STORAGE MEDIUM FOR DISPLAYING A DYNAMIC SPECIAL EFFECT

(71) Applicant: TENCENT TECHNOLOGY (SHENZHEN) COMPANY LIMITED, Shenzhen (CN)

(72) Inventors: Qianyi Wang, Shenzhen (CN); Yu Gao, Shenzhen (CN); Zhibin Wang, Shenzhen (CN); En Li, Shenzhen (CN); Rong Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 213 days.

(21) Appl. No.: 16/231,873

(22) Filed: Dec. 24, 2018

(65) Prior Publication Data

US 2019/0132642 A1 May 2, 2019

Related U.S. Application Data

(63) Continuation of application No. PCT/CN2017/106102, filed on Oct. 13, 2017.

(30) Foreign Application Priority Data

Oct. 17, 2016 (CN) .......................... 201610903697.2

(51) Int. Cl.
*H04N 21/44* (2011.01)
*H04N 21/8549* (2011.01)
(Continued)

(52) U.S. Cl.
CPC ..... *H04N 21/44012* (2013.01); *G06T 11/001* (2013.01); *G06T 11/203* (2013.01);
(Continued)

(58) Field of Classification Search
CPC ......... H04N 21/44012; H04N 21/4788; H04N 21/44008; H04N 21/8549; H04N 21/24;
(Continued)

(56) References Cited

U.S. PATENT DOCUMENTS

| 2014/0085509 | A1* | 3/2014 | Ichikawa | ........... H04N 5/23229 348/231.99 |
| 2016/0314354 | A1* | 10/2016 | Teuton | ................. G06K 9/0014 |
| 2016/0350981 | A1* | 12/2016 | Luo | ........................ G06F 3/0488 |

FOREIGN PATENT DOCUMENTS

| CN | 101212640 A | 7/2008 |
| CN | 103220490 A | 7/2013 |

(Continued)

OTHER PUBLICATIONS

State Intellectual Property Office of the People's Republic of China (SIPO) Office Action 1 for 201610903697.2 dated Mar. 12, 2019 8 Pages. (including translation).

(Continued)

*Primary Examiner* — Jennifer N To
*Assistant Examiner* — Ashley M Fortino
(74) *Attorney, Agent, or Firm* — Anova Law Group, PLLC

(57) ABSTRACT

A video processing method, a video processing device, and a storage medium are provided. The video processing method includes: determining target image frames corresponding to a dynamic special effect in a video and determining an attribute of a special effect element corresponding to the dynamic special effect in each of the target image frames and coordinates of the special effect element. The video processing method also includes: rendering the special effect element on a drawing interface based on the attribute and the coordinates of the special effect element; filling the target image frames into the drawing interface as a background and forming drawing interface frames with the (Continued)

dynamic special effect; and outputting the drawing interface frames corresponding to each of the target image frames.

20 Claims, 14 Drawing Sheets

(51) Int. Cl.
*H04N 21/431* (2011.01)
*H04N 21/4788* (2011.01)
*G06T 11/20* (2006.01)
*G06T 11/00* (2006.01)

(52) U.S. Cl.
CPC ... *H04N 21/4312* (2013.01); *H04N 21/44008* (2013.01); *H04N 21/4788* (2013.01); *H04N 21/8549* (2013.01)

(58) Field of Classification Search
CPC .......... H04N 21/234; H04N 21/23412; H04N 21/44; H04N 21/4312; G06T 11/203; G06T 11/001001; G06T 11/60; G06T 2200/24

See application file for complete search history.

(56) References Cited

FOREIGN PATENT DOCUMENTS

| | | |
|---|---|---|
| CN | 104394313 A | 3/2015 |
| CN | 104394324 A | 3/2015 |
| CN | 104618797 A | 5/2015 |
| CN | 104780458 A | 7/2015 |
| CN | 104967865 A | 10/2015 |
| CN | 106028052 A | 10/2016 |
| CN | 106385591 A | 2/2017 |
| KR | 101528312 B1 | 6/2015 |

OTHER PUBLICATIONS

World Intellectual Property Organization (WIPO) International Search Report for PCT/CN2017/106102 dated Dec. 28, 2017 6 Pages (including translation).

* cited by examiner

METHOD, DEVICE, AND STORAGE MEDIUM FOR DISPLAYING A DYNAMIC SPECIAL EFFECT

RELATED APPLICATION

This application claims priority to PCT Application No. PCT/CN2017/106102, filed on Oct. 13, 2017, which claim priority to Chinese Patent Application No. 201610903697.2, filed on Oct. 17, 2016. The two applications are incorporated herein by reference in their entirety.

FIELD OF THE TECHNOLOGY

The present disclosure relates to the field of video technologies, and particularly, to a video processing method, a video processing device, and a related storage medium.

BACKGROUND OF THE DISCLOSURE

With development of the Internet industry, especially mobile access to the Internet, sharing a video through the Internet is widely recognized as a new form of information exchange.

For example, in a mobile application, a user may record a video by using a mobile terminal such as a mobile phone. The user may share the video on a social network platform. Other users of the social network platform may view the video shared by the first user and provide comments, communicate, and share the video again by using an interactive function of the social network platform, sometimes with enhanced visual effects in the videos.

In the above example, when a user is recording a video or needs to share a video over the Internet, to emphasize or express a certain clip or a certain object in the video, the user usually needs to add a special effect to a corresponding clip or over the object to attract the attention of viewers. However, relevant technologies only support creating a simple graphic layer on each frame of image of a video, to achieve an effect of a graffiti, for example, in a video.

FIG. 1 is a schematic view of a display effect of making text graffiti on a frame of image in a video. The effect of making a graffiti by using letters "LALA" can be realized on one frame of image or at least two continuous frames of images in a video. However, when drawing a graphic layer on at least two frames of images in a video, a viewer may not know the clip or object of the video that a presenter intended to highlight if the viewer does not view the video from the beginning.

SUMMARY

In order to resolve the forgoing problem, embodiments of the present invention provide a video processing method, a video processing device, and a storage medium that can enhance an identification degree of a clip or a recorded object in a video.

A technical solution according to embodiments of the present disclosure is implemented as follows.

According to a first aspect, an embodiment of the present disclosure provides a video processing method. The video processing method includes: determining, by a computing device, target image frames corresponding to a dynamic special effect in a video and determining an attribute of a special effect element corresponding to the dynamic special effect in each of the target image frames and coordinates of the special effect element. The video processing method also includes: rendering, by the computing device, the special effect element on a drawing interface based on the attribute and the coordinates of the special effect element; filling, by the computing device, the target image frames into the drawing interface as a background and forming drawing interface frames with the dynamic special effect; and outputting the drawing interface frames corresponding to each of the target image frames.

According to a second aspect, an embodiment of the present disclosure provides a video processing device. The video processing device includes: a memory and a processor coupled to the memory. The processor is configured to determine target image frames corresponding to a dynamic special effect in a video; and determine an attribute of a special effect element corresponding to the dynamic special effect in each of the target image frames and coordinates of the special effect element. The processor is also configured to render on a drawing interface based on the attribute and the coordinates of the special effect element to create the special effect element; a synthesizing portion, fill the target image frames into the drawing interface as a background of the drawing interface and creating drawing interface frames with the dynamic special effect; and output the drawing interface frames corresponding to each of the target image frames.

According to another aspect, an embodiment of the present disclosure provides a storage medium storing computer program instructions executable by at least one processor to perform the video processing method provided in one embodiment of the present disclosure. The computer program instructions can cause the at least one processor to perform: determining target image frames corresponding to a dynamic special effect in a video and determining an attribute of a special effect element corresponding to the dynamic special effect in each of the target image frames and coordinates of the special effect element. The computer program instructions also cause the at least one processor to perform: rendering the special effect element on a drawing interface based on the attribute and the coordinates of the special effect element; filling the target image frames into the drawing interface as a background and forming drawing interface frames with the dynamic special effect; and outputting the drawing interface frames corresponding to each of the target image frames.

Embodiments consistent with the present disclosure provide a method for determining target video frames for which a dynamic special effect needs to be formed in a video; determining a video frame corresponding to a clip or a specific object in a video as a target video frame. Embodiments of the present disclosure thereby provides a way to customize a dynamic special effect in the video upon demand.

For the audience of a video, regardless of a time point of a video at which the video is being viewed, since the eye-catching duration of a dynamic special effect is far longer than a static effect formed by a graphic layer drawn in the video, embodiments of the present disclosure enhance users ability to identify a clip or object that needs to be highlighted by the video presenter, which improves user experience of video sharing.

DESCRIPTION OF EMBODIMENTS

Figure 1:
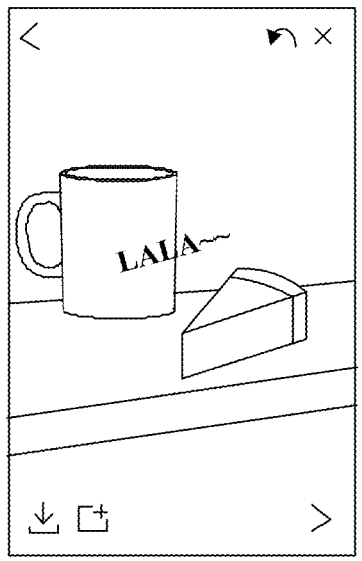
FIG. 1 is a schematic view of implementation of a special effect in a video consistent with embodiments of the present disclosure.

The following describes the present disclosure in detail with reference to the accompanying drawings and the embodiments. It should be understood that the embodiments provided therein are not intended to limit the present disclosure, but only intended to interpret the present disclosure. In addition, the described embodiments are some of the embodiments for implementing the present disclosure rather than all of the embodiments for implementing the present disclosure. All other embodiments obtained by recombining the technical solutions of the embodiments by a person skilled in the art without creative efforts and other embodiments based on the implementation of the present disclosure shall fall within the protection scope of the present disclosure.

It should be noted that the terms "include", "comprise", and any variants thereof in the embodiments of the present disclosure are intended to cover a non-exclusive inclusion. Therefore, a method or a device that includes a series of elements not only includes such elements that are disclosed expressly, but also includes other elements not specified expressly, or may include inherent elements of the implementation method and device. Unless otherwise specified, an element limited by "include a/an . . . " does not exclude other relevant elements existing in the method or device including the element. For example, steps in a method or parts in a device, the parts herein may be a part of a circuit, a part of a processor, and a part of program or software, and may also be a unit that may be modularized or non-modularized.

For example, a video processing method according to an embodiment of the present disclosure may include a series of steps. However, the video processing method according to an embodiment of the present disclosure is not limited to steps disclosed therein. Likewise, a video processing device according to an embodiment of the present disclosure includes a series of parts. However, the video processing method according to an embodiment of the present disclosure is not limited to parts expressly disclosed therein and may also include parts configured to obtain relevant information or perform processing based on information.

Before embodiments of the present disclosure are described in detail, nouns and terms involved in the embodiments of the present disclosure are explained, and the nouns and terms involved in the embodiments of the present disclosure are applicable to the following explanations.

Dynamic special effect refers to a dynamic visual effect added to a video. A dynamic special effect may be a light painting special effect in the present disclosure. That is, a dynamic visual effect with a specific attribute drawn in a video by moving an optical source. For example, a trace of moving the optical source or various patterns formed by the optical source.

Special effect element is a basic visual unit constituting a dynamic special effect. For example, when a light painting special effect is formed by using a particle system such as a MAYA particle system or a 3D MAX particle system, a basic unit constituting a light painting special effect is also referred to as a particle.

An attribute is used to describe a manner for constructing and forming a dynamic special effect by a special effect element, for example, describing a dynamic special effect by a size, color, a quantity or by a speed, an acceleration speed, and a life cycle.

An image frame is a basic unit forming a video. One image frame is a static image. Continuously collected image frames are rendered to form a dynamic visual effect.

Visual effects refer to when a dynamic special effect is added to a video. The dynamic special effect is carried by a series of image frames (also referred to as target image frames) in the video, the dynamic special effect may be decomposed into a series of static visual effects for the target image frames. A series of continuous static visual effects constitute an effect of dynamic changes having a special effect. A visual effect is corresponding to a target image frame. The visual effect of the target image frame may be further decomposed into positions and attributes of the special effect element on the target image frames.

A drawing interface is also referred to as a canvas for presenting and dynamically displaying a special effect element and graphic elements in an image frame. Usually, graphic elements are presented and displayed on a drawing interface by using a scripting language (usually JavaScript).

Figure 2:
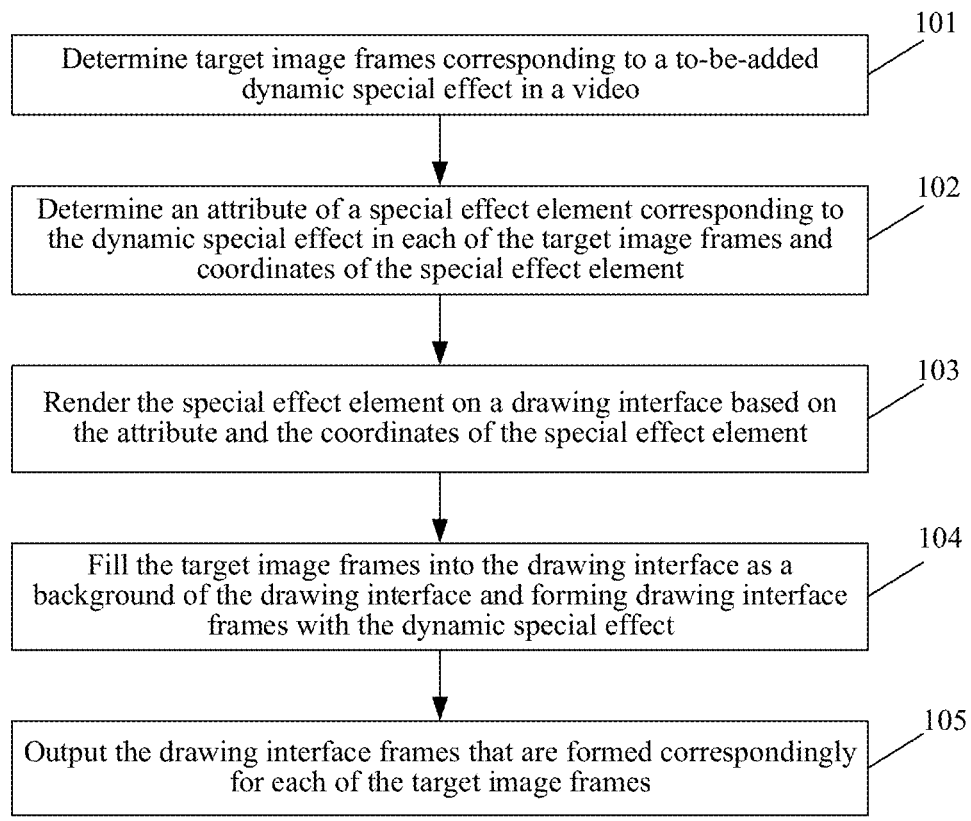
FIG. 2 is a schematic flowchart of a video processing method according to an embodiment of the present disclosure.

FIG. 2 is a schematic view of architecture of a video processing method according to an embodiment of the present disclosure. The video processing method includes: step 101: determining target image frames corresponding to a to-be-added dynamic special effect in a video; step 102: determining an attribute of a special effect element corresponding to the dynamic special effect in each of the target image frames and a pair of coordinates of the special effect element; step 103: rendering the special effect element on a drawing interface based on the attribute and the coordinates of the special effect element; step 104: filling the target image frames into the drawing interface as a background of the drawing interface and forming drawing interface frames with the dynamic special effect; and step 105: outputting the drawing interface frames that are formed correspondingly for each of the target image frames.

An embodiment of the present disclosure further provides a video processing device for implementing the video processing method, and the video processing device may be implemented by using various manners, and will be described as follows.

For example, the video processing device may be implemented by a terminal at a user side (such as a smartphone and a tablet PC) and hardware resources in a server at a network side cooperatively. Referring to a schematic flowchart of the video processing method shown in FIG. 3, the video processing device in FIG. 3 is distributed and implemented in the terminal at the user side and the server at the network side, and the terminal at the user side and the server at the network side may communicate in various manners, for example, cellular communications based on communications modes such as Code Division Multiple Access (CDMA) and Wideband Code Division Multiple Access (WCDMA) and evolved modes thereof, and communications based on Wireless Fidelity (Wi-Fi).

Figure 3:
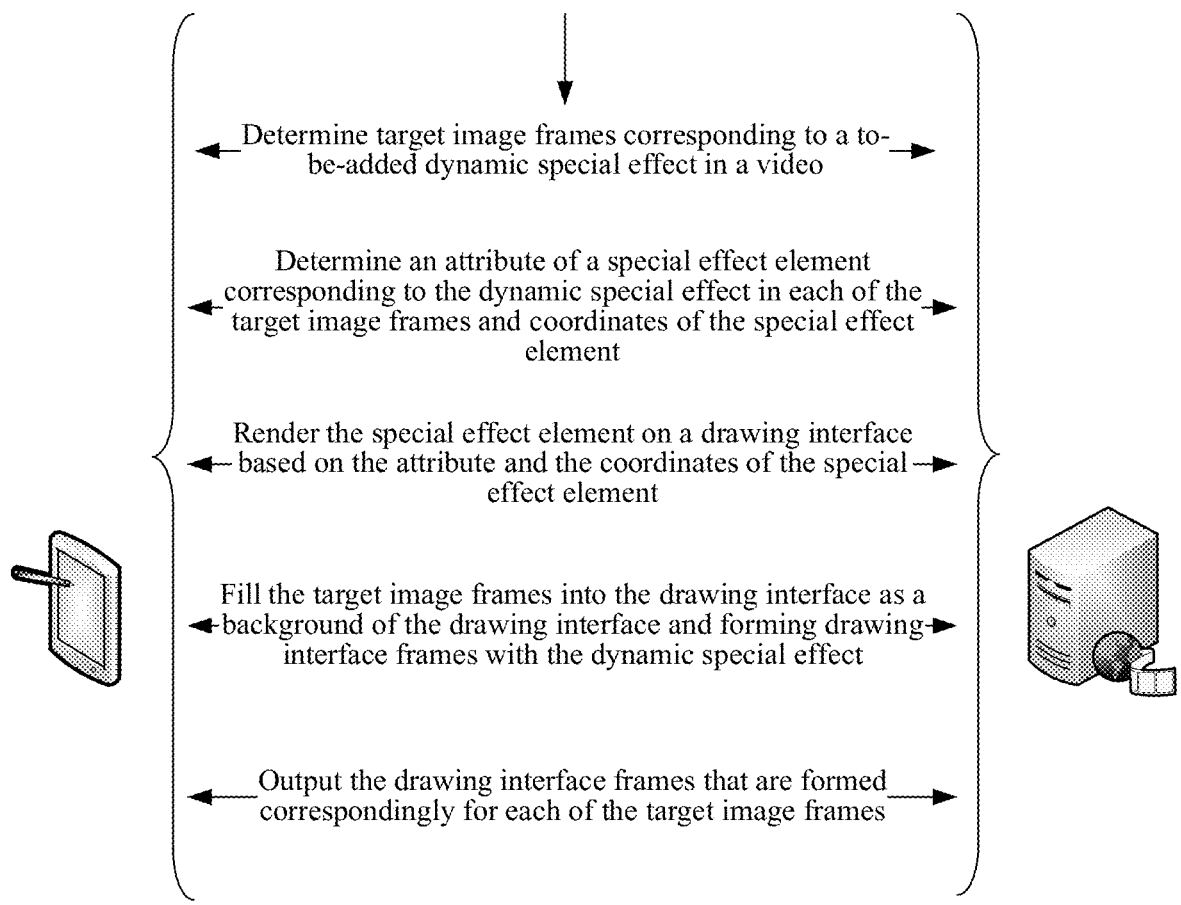
FIG. 3 is a schematic flowchart of a video processing method that is implemented at a user side and a network side cooperatively according to an embodiment of the present disclosure.

In FIG. 3, the terminal at the user side and the server at the network side perform data interaction through established communications to implement steps 101 to 105 shown in FIG. 2. Steps performed by the terminal and the server are not limited in the embodiments of the present disclosure and may be adjusted flexibly according to user requirements. In addition, usually, the terminal at the user side may collect a video.

Furthermore, for example, the video processing device may be implemented by a hardware resource of the terminal at the user side. That is, the video processing device may be implemented in the terminal at the user side. The terminal at the user side may perform steps 101-105 shown in FIG. 2.

Furthermore, for example, the video processing device may be implemented by a hardware resource in the server at the network side. That is, the video processing device may be implemented in the server at the network side. The server at the network side may perform steps 101-105 shown in FIG. 2.

According to the manner for implementing the video processing device, hardware resources for implementing the video processing device may include computation resources such as a processor and a memory and communications resources such as a network interface. The video processing device may also be implemented as an executable instruction, including a computer executable instruction such as a program and a module, stored in a storage medium.

Figure 4:
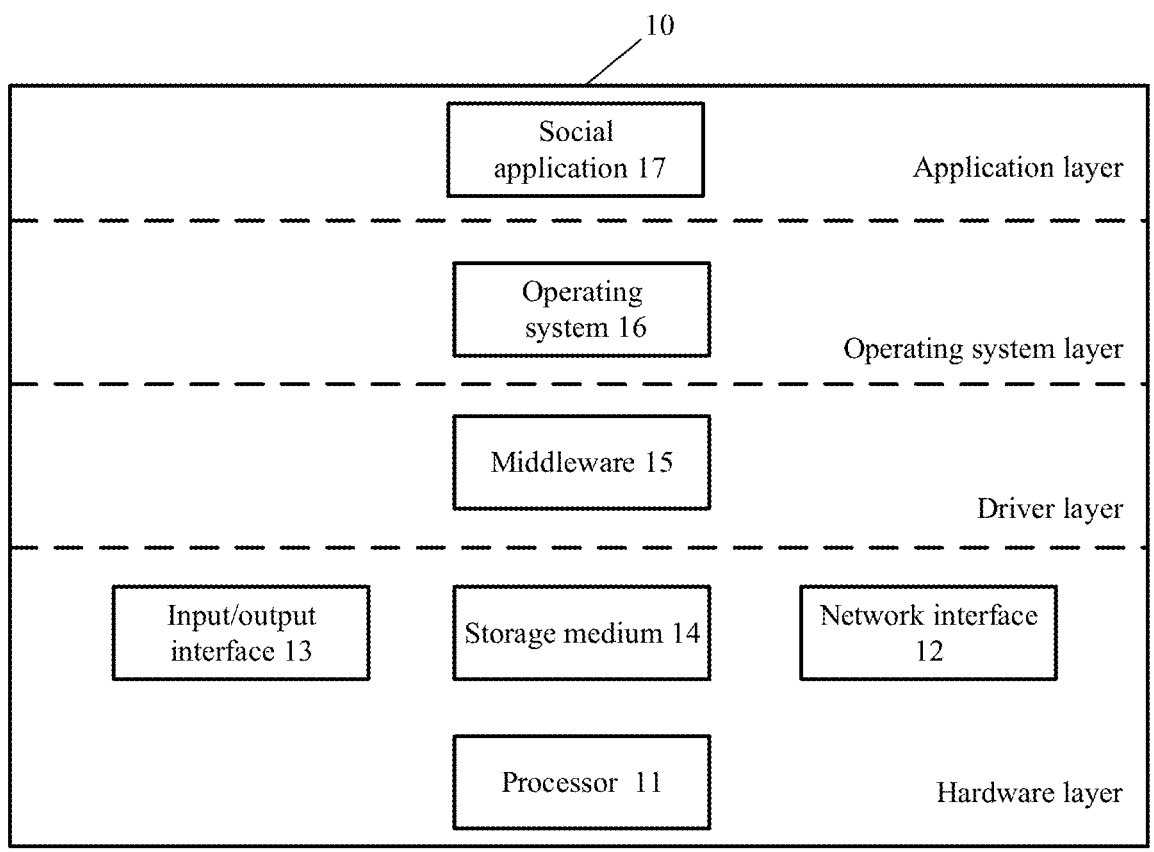
FIG. 4 is a schematic view of a software and hardware structure of a video processing device according to an embodiment of the present disclosure.

As stated above, when the video processing device is implemented based on the hardware resources in the terminal at the user side, referring to a schematic view of a software and hardware structure of the video processing device 10 shown in FIG. 4, the video processing device 10 may include a hardware layer, a driver layer, an operating system layer, and an application layer. However, a person skilled in the art should understand that, the structure of the video processing device 10 shown in FIG. 4 is only exemplary, and does not limit the structure of the video processing device 10. For example, more components than those in FIG. 4 may be configured for the video processing device 10 according to implementation demand, or some components may be omitted according to implementation demand.

The hardware layer of the video processing device 10 may include processor 11, an input/output interface 13, a storage medium 14, and a network interface 12. The components may be connected to communicate through a system bus.

The processor 11 may be implemented as a Central Processing Unit (CPU), a Microcontroller Unit (MCU), an Application Specific Integrated Circuit (ASIC) or a Field-Programmable Gate Array (FPGA).

The input/output interface 13 may be implemented as an input/output device such as a display screen, a touch screen, and a speaker.

The storage medium 14 may be implemented as a non-volatile storage medium such as a flash disk, a hard disk, and an optical disk, and may also be implemented as a volatile storage medium such as Double Data Rate (DDR) dynamic cache. The storage medium 14 stores executable instructions for performing the video processing method.

For example, the storage medium 14 may be disposed integrally with other components of the video processing device 10, or disposed separately relative to other components of the video processing device 10. The network interface 12 may provide the processor 11 with access ability of external data such as a storage medium 14 set in a different place. For example, the network interface 12 may be based on short-range communications performed according to Near Field Communication (NFC) technology, Bluetooth technology, and ZigBee technology. In addition, communications in communications modes such as CDMA and WCDMA and evolved modes thereof may also be implemented.

The driver layer includes middleware 15 that is used for the operating system 16 to identify a hardware layer and communicate with each component of the hardware layer, for example, may be a collection of driving programs for each component of the hardware layer.

The operating system 16 is configured to provide a user-oriented graphic interface, which may include a plug-in icon, a desktop background, and an application icon. The operating system 16 supports a user controlling a device through the graphic interface. The embodiments of the present disclosure do not limit the software environment of the device such as a type and a version of the operating system, for example, the operating system may be a Linux operating system, a UNIX operating system, and another operating system.

The application layer includes an application running on a terminal at a user side. As stated above, when it is necessary to realize a function of sharing a recorded video on a social network platform, a social network application 17 runs in the application layer.

For example, the video processing device is implemented on a terminal at a user side. The video processing method shown in FIG. 2 is applied in the following scene: a user sets a time period for forming a dynamic special effect in a video (for example, displaying a dynamic special effect from the fifth minute to the sixth minute of the video) and sets a position forming the dynamic special effect in a video frame (image frame) (for example, displaying the dynamic special effect in the center of the video frame).

Figure 5A:
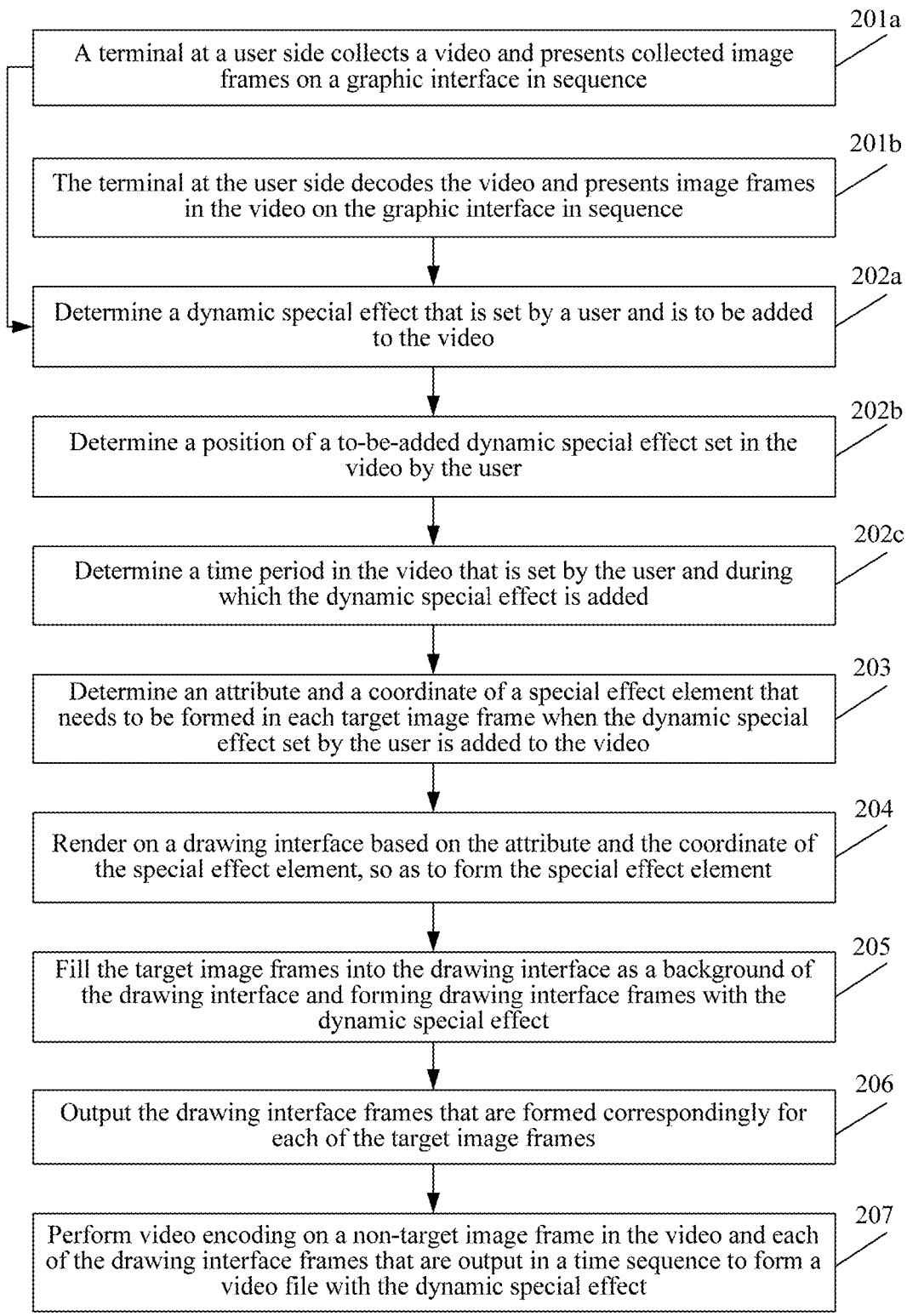
FIG. 5A is a schematic flowchart of a video processing method according to an embodiment of the present disclosure.

Referring to the optional schematic flowchart of the video processing method shown in FIG. 5A, the video processing method according to an embodiment of the present disclosure can be used to process a video collected by a terminal in real time.

Step 201a: A terminal at a user side may collect a video and presents collected image frames on a graphic interface in sequence.

For example, the method may be applicable to a scene that a user records a video of an environment. When the terminal at the user side operates a client of a social network platform, a function of recording and sharing is triggered, a rear camera of the terminal is selected from the graphic interface to record a video of the environment, and collected image frames are presented on the graphic interface of the screen of the terminal in sequence.

Furthermore, for example, the method may be applicable to a scene that a user takes a selfie. When the terminal at the user side operates a client of a social network platform, a function of taking and sharing a selfie is triggered, a front camera of the terminal is selected from the graphic interface to record a video of a user and an environment where the user is located, and collected image frames are presented on the graphic interface of the screen of the terminal in sequence.

The video processing method according to the embodiment of the present disclosure may be further used to add a dynamic special effect to a video (file) stored in the terminal locally in advance, for example, process a video collected by the terminal in advance and a video received from a network side or other terminals.

Step 201b: The terminal at the user side may decode the video and presents image frames in the video on the graphic interface in sequence.

It can be understood that, steps 201a and 201b are steps performed according to the type of the video data, i.e., whether the video is collected in real time or stored in advance.

Step 202a : Determine a dynamic special effect, which can also be referred to as a to-be-added special effect, that is set by a user and is to be added to the video.

In one embodiment, when the terminal at the user side presents video frames in a video on the graphic interface, the terminal may present virtual identifiers of candidate dynamic special effects that may be added to a current video, for example, present serial numbers, titles, or thumbnails of candidate dynamic special effects on the graphic interface, and determine a dynamic special effect that needs to be added according to a virtual identifier triggered by the user.

In another embodiment, when the terminal at the user side presents video frames in a video on the graphic interface, the terminal may present a virtual switch of a dynamic special effect that may be formed in the current video, for example, present titles or thumbnails of dynamic special effects on the graphic interface. When the user triggers a virtual identifier, a default dynamic special effect that is set in advance is determined.

Step 202b : Determine a position of a to-be-added dynamic special effect set in the video by the user.

In one embodiment, a position set by the user in the currently presented image frame is identified. The identified position is used as a position where a dynamic special effect is added.

For example, a specific touch gesture (e.g., a three-point touch control and double click) is preset and used as a triggering operation for presenting a dynamic special effect in a frame image, when the operation implemented by the user is detected in the frame image presented on the graphic interface, the detected position of the corresponding operation is used as a position where the dynamic special effect needs to be added. For example, when the area of the dynamic special effect is large, the position may be used as a central position of the dynamic special effect. Furthermore, for example, the position may be used as a position where the dynamic special effect initially occurs when the dynamic special effect begins, or as a position where the dynamic special effect occurs in the end when the dynamic special effect disappears.

Furthermore, for example, when a newly collected image frame is displayed on the graphic interface, or an image frame newly decoded from the video is displayed, a virtual identifier of the dynamic special effect on the graphic interface that is dragged by the user and the position in the image frame where the virtual identifier is released are identified. The identified position is used as a position of the dynamic special effect that needs to be added to the video. For example, as a central position for forming the dynamic special effect, or a starting position or an ending position for forming the dynamic special effect.

In another embodiment, an operation trace of a user in a video is tracked and identified. A position in each image frame through which the operation trace of the user passes is determined as a position in a corresponding image frame where a dynamic special effect is added.

For example, when a collected image frame or an image frame decoded from the video is displayed on a graphic interface, a contact between a finger tip of the user and the graphic interface is detected, and a moving trace of the contact is identified. If the contact is at position 1 in an image frame 1, at position 2 in an image frame 2, and so on, at position n in an image frame n, a continuous moving trace is formed from positions 1 to n, and furthermore, the position i of the image frame i ($1 \leq i \leq n$) is a position for adding the dynamic special effect.

Step 202c : Determine a time period in the video that is set by the user and during which the dynamic special effect is being added.

The time period for the dynamic special effect refers to a time period on a time axis of the video corresponding to a life cycle of the dynamic special effect when the dynamic special effect is added to the video.

In one embodiment, the dynamic special effect set by the user may have a predetermined life cycle (for example, 10 seconds, that is, the dynamic special effect disappears in 10 seconds), and correspondingly, timing starts when detecting the user triggers an operation of forming the dynamic special effect till the time period the life cycle reaches is used as the time period in the video during which the dynamic special effect needs to be added.

For example, when the foregoing specific touch gesture is detected or the operation of dragging the virtual identifier of the dynamic special effect and releasing the virtual identifier at a certain position in the image frame is detected, timing starts for the life cycle of the dynamic special effect till the life cycle reaches the time period. The dynamic special effect set by the user is added at the same position (that is, the position of the to-be-added dynamic special effect determined in step 202c ) of the image frames during the time period.

In another embodiment, an operation trace of a user in a video is tracked and identified. A dynamic special effect is formed around the operation race of the user, and accordingly, the time period for adding the dynamic special effect is a time period from detecting the operation of the user to releasing the user operation during a video playing process.

For example, when a collected image frame or an image frame decoded from the video is displayed on a graphic interface, a contact between a finger tip of a user and the graphic interface is detected, the time of identifying the contact (it is assumed that the video has been played to the fifth minute) and the time of identifying releasing of the contact (it is assumed that the video has been played to the sixth minute) are determined. The playing time period from the fifth minute to the sixth minute in the video is a time period during which a dynamic special effect needs to be added.

It is apparent that, when the time period of the dynamic special effect is determined, image frames in the time period can be determined as target image frames for carrying the dynamic special effect according to the time axis of the video. For example, as stated in the foregoing example, the image frames corresponding to the fifth minute to the sixth minute in the video are used to carry the dynamic special effect.

It can be understood that, the processes of determining a to-be-added dynamic special effect and determining a corresponding position and time period in steps 202a to 202c are in a random sequence. The foregoing sequence of describing the steps should not be deemed as limitation on the sequence of performing steps 202a to 202c.

Step 203: Determine an attribute and coordinates of a special effect element that needs to be formed in each target image frame when the dynamic special effect set by the user is added to the video.

In one embodiment, according to the to-be-added dynamic special effect of the video, a visual effect of each target image frame is determined when the to-be-added dynamic special effect is carried by target image frames, the visual effect is a "snapshot" for the attributes (such as a quantity of special effect elements, initial speed, gravitational acceleration speed, centripetal force, centrifugal force, tangential acceleration speed, autorotation speed, autorotation acceleration speed, initial size, ending size, initial color, ending color, color mixing method, life cycle, and life cycle) for forming the dynamic special effect in different stages, analysis is performed based on the visual effects. Static attributes (such as a quantity, a size, and a color of special effect elements) of the special effect element that needs to be formed by rendering in a corresponding target image frame and positions of the special effect elements in the target image frame are determined when each of the target image frames forms a corresponding visual effect.

Figure 5B:
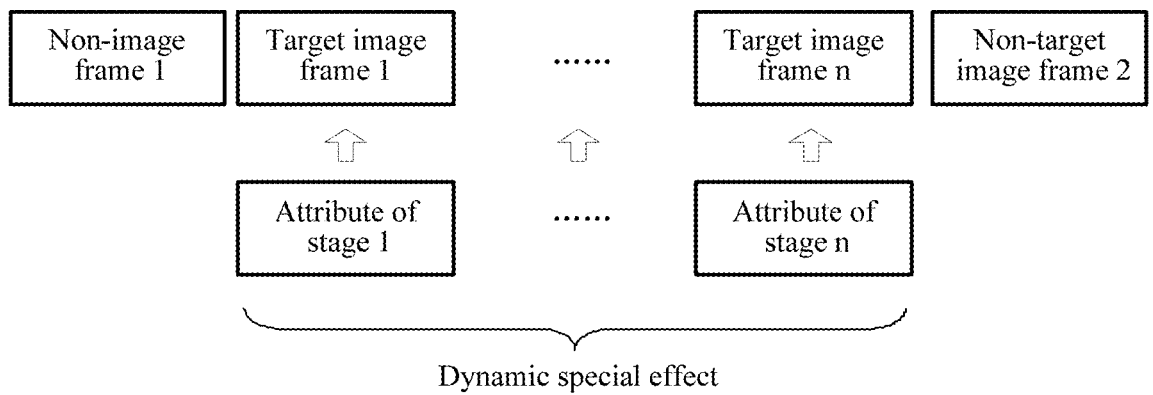
FIG. 5B is a schematic view of image frames that are mapped to a video in different stages of a dynamic special effect according to an embodiment of the present disclosure.

For example, as shown in FIG. 5B, a method for mapping visual effect attributes of the dynamic special effect in different stages (including stages 1-5) to each target image frame (target image frames 1-n) is used to compute an attribute and a position of a special effect element. The special effect element is formed by rendering the element when a corresponding visual effect is formed in each target image frame.

Step 204: Render the special effect element on a drawing interface based on the attribute and the coordinates of the special effect element.

In one embodiment, for each target image frame, based on the position and the corresponding attribute of the special effect element computed for the corresponding target image frame, a blank drawing interface with a black background (the size of the drawing interface is consistent with the size of the image frame) needs to have the position of the coordinates of the special effect element. The special effect element is rendered according to the attribute of the special effect element at the position obtained through computation, to form the special effect element with the corresponding attribute.

Figure 5C:
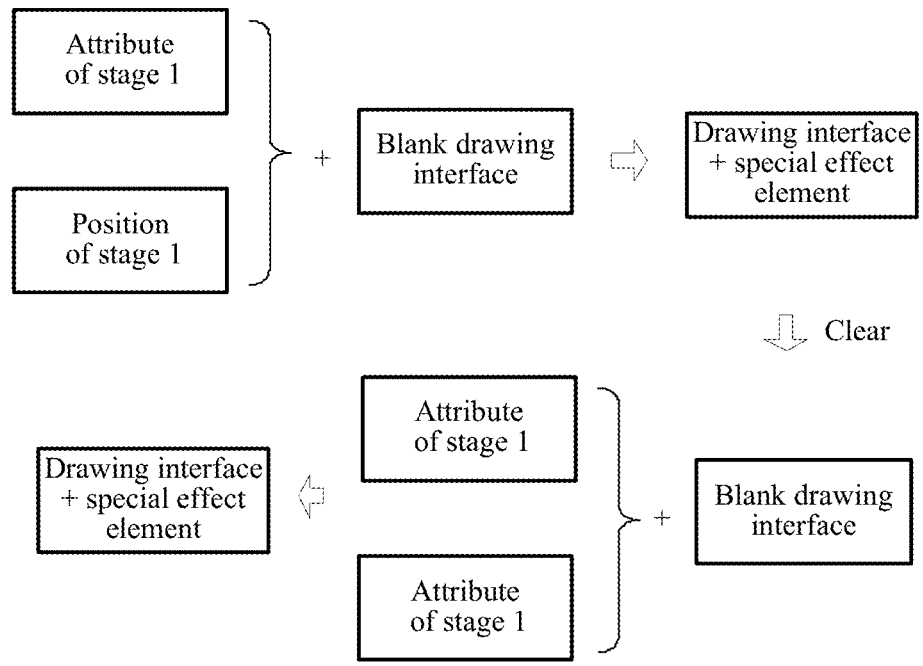
FIG. 5C is a schematic view of drawing a special effect element for a target image frame and a mapped dynamic special effect of a corresponding stage according to an embodiment of the present disclosure.

For example, as shown in FIG. 5C, stage 1 of the dynamic special effect is mapped to target image frame 1. An attribute and a position of a special effect element that needs to be formed in the target image frame 1 is calculated according to stage 1. At a position on the blank drawing interface corresponding to the special effect element, a corresponding position is selected to form the special effect element with the corresponding attribute according to the attribute of the special effect element at each position obtained through computation, thereby obtaining a drawing interface that may be combined with the target image frame 1.

It can be understood that, it is necessary to render a special effect element that should exist in a corresponding target image frame on the blank drawing interface for each target image frame. Therefore, after a special effect element corresponding to a target image frame is rendered on the blank drawing interface, if a special effect element corresponding to another image frame further needs to be rendered, the drawing interface need to be cleared.

For example, as shown in FIG. 5C, after the special effect element corresponding to target image frame 1 is formed by rendering on the drawing interface, if a special effect element corresponding to target image frame 2 further needs to be formed, the drawing interface need to be cleared. At a position of the blank drawing interface corresponding to a special effect element of target image frame 2, according to an attribute of a special effect element at each position obtained through computation, the corresponding position is selected to form a special effect element with a corresponding attribute, thereby obtaining a drawing interface that may be combined with target image frame 2.

In another embodiment, when a size of a target image frame is inconsistent with a size of a drawing interface, coordinates of a special effect element needs to be normalized based on the size of the target image frame to form a normalized coordinate. A position on a blank drawing interface with a black background corresponding to the normalized coordinate of the special effect element is rendered to form a special effect element with a corresponding attribute. This would avoid the problem that a position of a special effect element formed by rendering and a position that is set by a user in a video and used for forming a dynamic special effect are inconsistent, and ensure the precision of forming a position of a dynamic special effect in a video.

Step 205: Fill the target image frames into the drawing interface as a background of the drawing interface and forming drawing interface frames with the dynamic special effect.

Step 206: Output the drawing interface frames that are formed correspondingly for each of the target image frames.

In one embodiment, as shown in FIG. 5, target image frame 1, as a background, is filled into a drawing interface. The drawing interface frame is formed by rendering target image frame 1 with the special effect element. The same method may be used to form drawing interface frames 2-*n*.

In some embodiments, a terminal at a user side outputs a drawing interface frame in real time, so that the user may view a dynamic special effect set in a video in time. The video being viewed may be a pre-stored video or a video created in real time by the user.

In one embodiment, the following step is performed.

Step 207: Perform video encoding on a non-target image frame in the video and each of the drawing interface frames that are outputted in a time sequence to form a video file with the dynamic special effect.

Figure 5D:
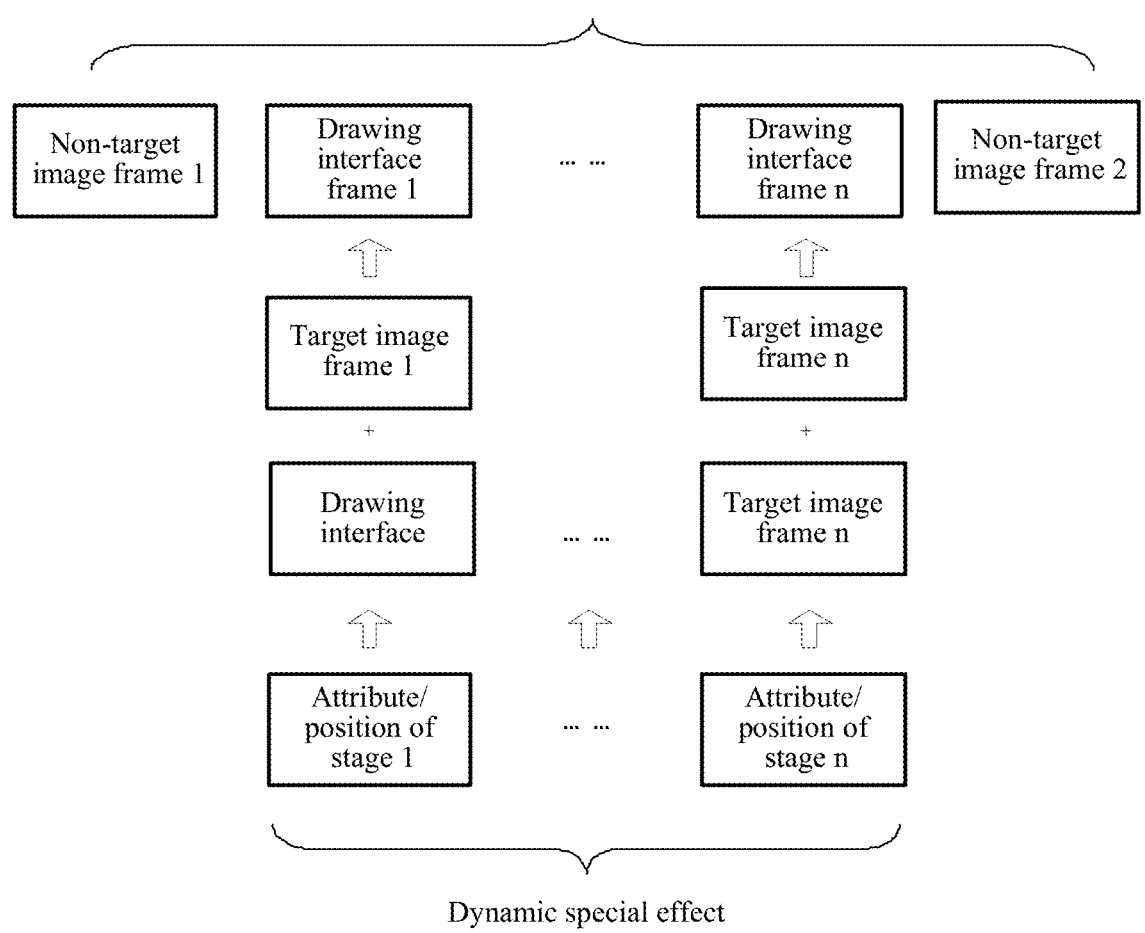
FIG. 5D is a schematic view of synthesizing a target image frame and a drawing interface on which a special effect element is drawn according to an embodiment of the present disclosure.

For example, as shown in FIG. 5D, video encoding is performed on target image frame 1, drawing interface frames 1 and 2. Non-target image frame 2 in sequence to form a video file with user settings that is to be encoded and played at the terminal at the user side locally, or shared on a social network platform to be accessed by other users. Since the dynamic special effect has been carried in drawing interface frames 1-*n*, when the video file is played, a dynamic special effect set by the user at a specific position of a specific video clip may be viewed, so that the video clip (and the position of presenting the dynamic special effect in the video) can be quickly understood as a part that is emphasized by a video issuer, to realize an effect that a user hopes that a viewer could pay attention to a specific video clip or a specific position in a video when sharing the video.

For example, a video processing device is implemented on a terminal at a user side. The following describes that the video processing method shown in FIG. 2 is applied in the following scene: a user implements a specific action in a video and a trace of the specific action is tracked to add a dynamic special effect corresponding to the trace to the video automatically.

Figure 6:
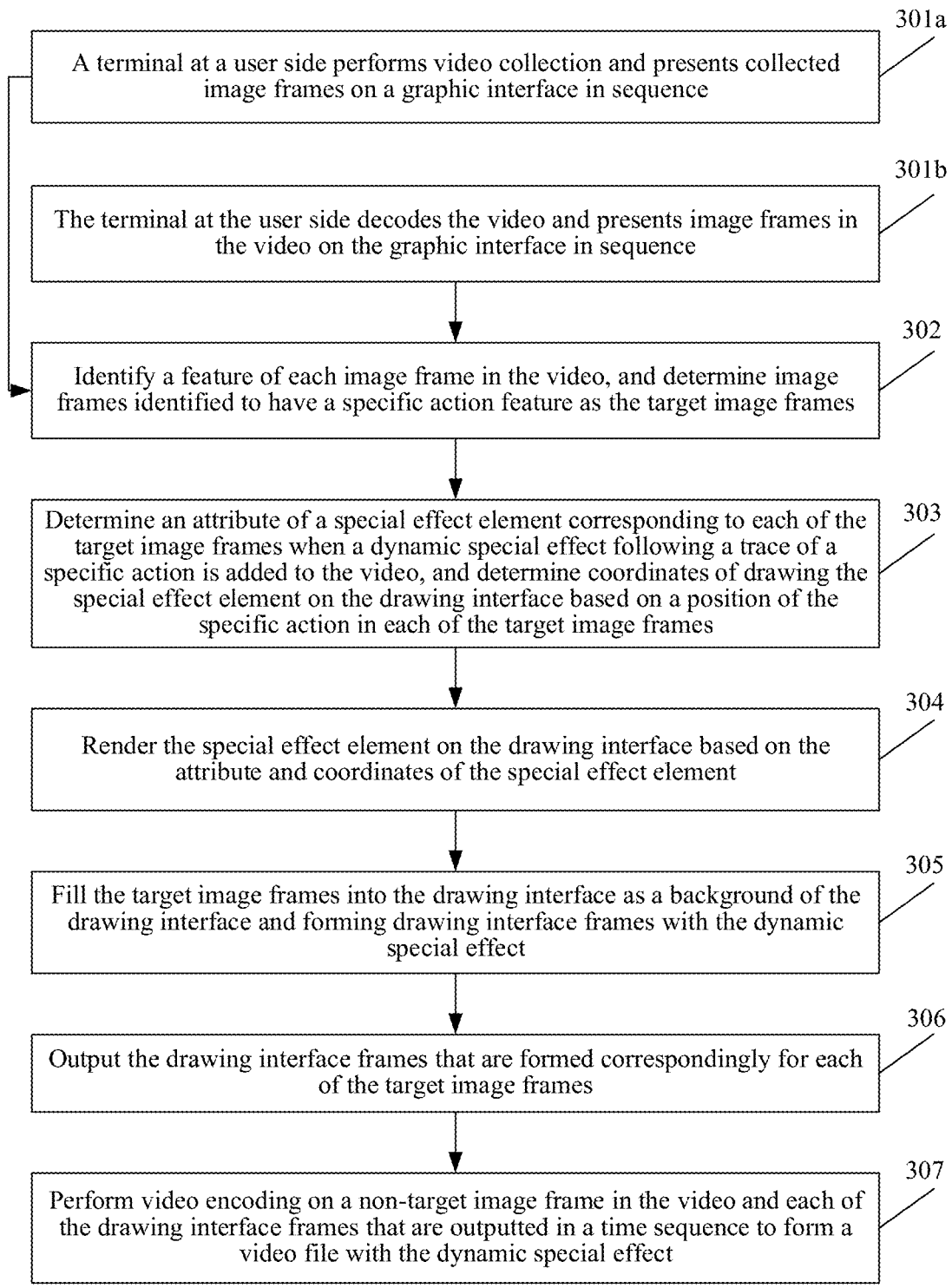
FIG. 6 is a schematic flowchart of a video processing method according to an embodiment of the present disclosure.

Referring to the optional schematic flowchart of the video processing method shown in FIG. 6, the video processing method according to an embodiment of the present disclosure may be used to process a video collected by a terminal in real time, and correspondingly, refer to step 301*a*:

Step 301*a* : A terminal at a user side performs video collection and presents collected image frames on a graphic interface in sequence.

For example, it may be applicable to a scene that a user records a video of an environment, and furthermore, for example, it may be applicable to a scene that a user takes a selfie.

The video processing method according to an embodiment of the present disclosure may further be used to process a video (file) locally stored in a terminal in advance, for example, process a video collected by the terminal in advance and a video received from a network side or other terminals, and correspondingly, refer to step 302*b*:

Step 301*b* : The terminal at the user side decodes the video and presents image frames in the video on the graphic interface in sequence.

It can be understood that, steps 301*a* and 301*b* are steps performed according to a type of the video (e.g., whether the video is collected in real time or pre-stored).

Step 302: Identify a feature of each image frame in the video, and determine image frames identified to have a specific action feature as the target image frames.

In one embodiment, when collected image frames are played on the graphic interface or image frames obtained by decoding a video are played on the graphic interface, a feature is extracted from the image frames presented on the graphic interface, the extracted feature is compared with a preset action feature (such as a facial movement and a finger movement). An image frame with the preset action feature is determined as a target image frame to which a dynamic special effect needs to be added.

Step 303: Determine an attribute of a special effect element corresponding to each of the target image frames when a dynamic special effect following a trace of a specific action is added to the video, and determine coordinates of drawing the special effect element on the drawing interface based on a position of the specific action in each of the target image frames.

Step 304: Render on the drawing interface based on the attribute and coordinate of the special effect element, to form a special effect element.

Step 305: Fill the target image frames into the drawing interface as a background of the drawing interface and forming drawing interface frames with the dynamic special effect.

Step 306: Output the drawing interface frames that are formed correspondingly for each of the target image frames.

Implementation details of steps 303-306 may be learned with reference to those disclosed in steps 204-206 and will not be described additionally.

In one embodiment, the following step may be further performed:

Step 307: Perform video encoding on a non-target image frame in the video and each of the drawing interface frames that are outputted in a time sequence to form a video file with the dynamic special effect.

For example, as shown in FIG. 5D, video encoding is performed on target image frame 1, drawing interface frames 1 and 2. Non-target image frame 2 in sequence to form a video file with user settings that is to be encoded and played at the terminal at the user side locally, or shared on a social network platform to be accessed by other users.

Since the dynamic special effect has been carried in drawing interface frames 1-*n*, when the video file is played, a dynamic special effect corresponding to a trace of a specific action may be viewed, so that the specific action in the video can be quickly understood as a part that is emphasized by a video issuer, to realize an effect that a user hopes that a viewer could pay attention to the specific action when sharing the video.

For example, a video processing device is implemented on a terminal at a user side, the following describes that the video processing method shown in FIG. 2 is applied in the following scene: a dynamic special effect tracking an outline of a specific object is added to a video.

Figure 7:
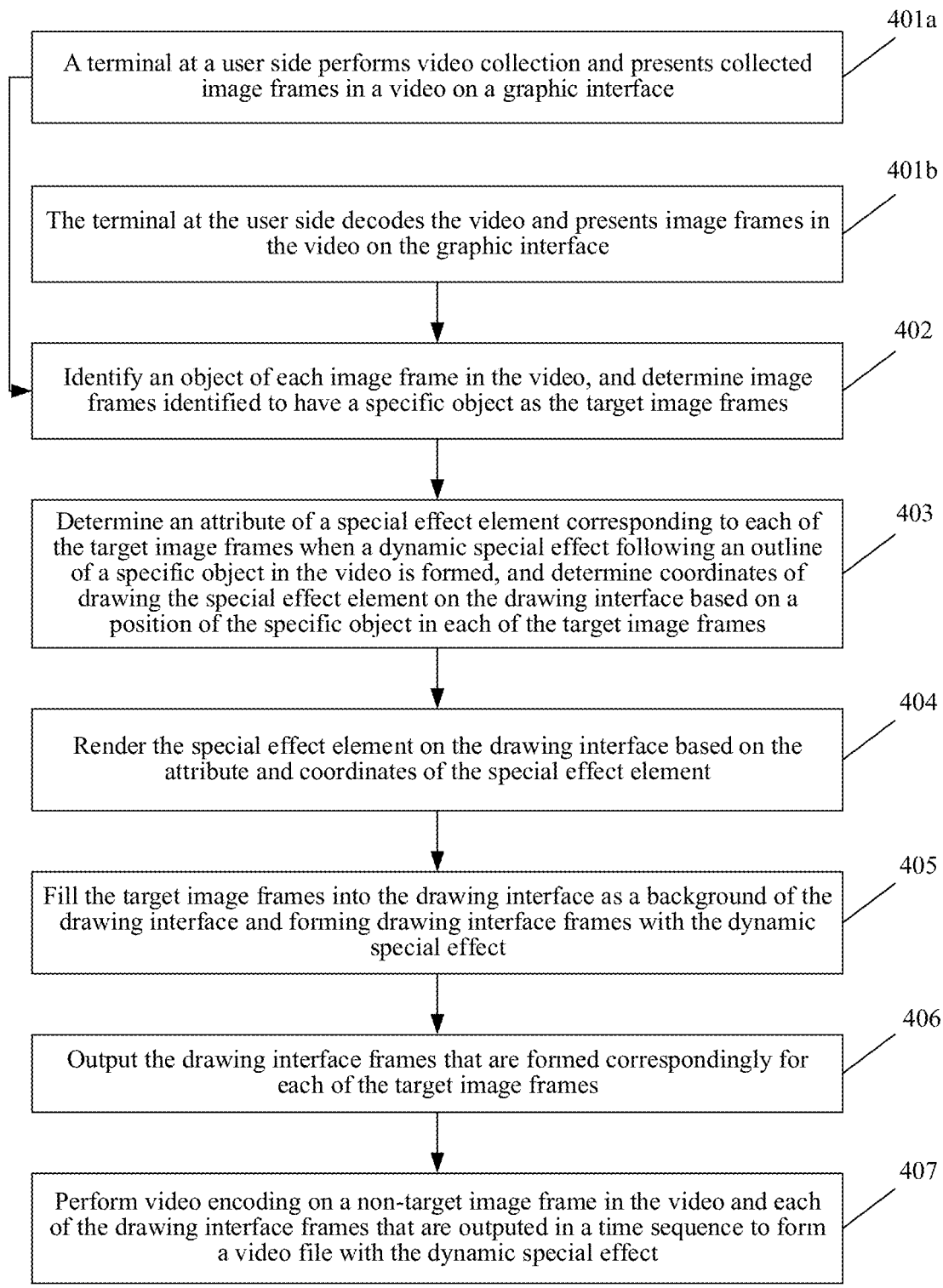
FIG. 7 is a schematic flowchart of a video processing method according to an embodiment of the present disclosure.

Referring to the optional schematic flowchart of the video processing method shown in FIG. 7, the video processing method according to an embodiment of the present disclosure may be used to process a video collected by a terminal in real time.

Step 401*a* : A terminal at a user side performs video collection and presents collected image frames on a graphic interface.

For example, it may be applicable to a scene that a user records a video of an environment. Furthermore, for example, it may be applicable to a scene that a user takes a selfie.

The video processing method according to an embodiment of the present disclosure may further be used to process a video (file) locally stored in a terminal in advance, for example, process a video collected by a terminal in advance and a video received from a network side or other terminals, and correspondingly, refer to step 401*b*:

Step 401*b*: The terminal at the user side decodes the video and presents image frames in the video on the graphic interface.

It can be understood that, steps 401*a* and 401*b* are steps performed correspondingly according to a type of the video (whether the video is collected in real time or pre-stored).

Step 402: Identify an object of each image frame in the video, and determine image frames identified to have a specific object as the target image frames.

Step 403: Determine an attribute of a special effect element corresponding to each of the target image frames when a dynamic special effect following an outline of a specific object in the video is added to the video, and determine coordinates of drawing the special effect element on the drawing interface based on a position of the specific object in each of the target image frames.

Step 404: Render on the drawing interface based on the attribute and coordinate of the special effect element, to form a special effect element.

Step 405: Fill the target image frames into the drawing interface as a background of the drawing interface and forming drawing interface frames with the dynamic special effect.

Step 406: Output the drawing interface frames that are formed correspondingly for each of the target image frames.

In a typical application scene, a terminal at a user side outputs a drawing interface frame in real time, so that the user may view a dynamic special effect set in a video (for example, a pre-stored video or a video that is formed in real time when the terminal at the user side is collecting an environment) on time.

In one embodiment, the following step may be further performed.

Step 407: Perform video encoding on a non-target image frame in the video and each of the drawing interface frames that are outputted in a time sequence to form a video file with the dynamic special effect For example, as shown in FIG. 5D, video encoding is performed on target image frame 1, drawing interface frames 1 and 2, and non-target image frame 2 in sequence to form a video file with user settings that is to be encoded and played at the terminal at the user side locally, or shared on a social network platform to be accessed by other users Because the dynamic special effect has been carried in drawing interface frames 1-*n*, when the video file is played, a dynamic special effect tracking the outline of the specific object may be viewed, so that the object with the dynamic special effect in the video and the movement frame thereof can be quickly understood as a part that is emphasized by a video issuer, to realize an effect that a user hopes that a viewer could pay attention to the specific object when sharing the video.

The following describes an example of constructing a light painting special effect by using a particle system tool. A basic unit for the particle system tool to construct a light painting special effect is also referred to as a particle.

Figure 8A:
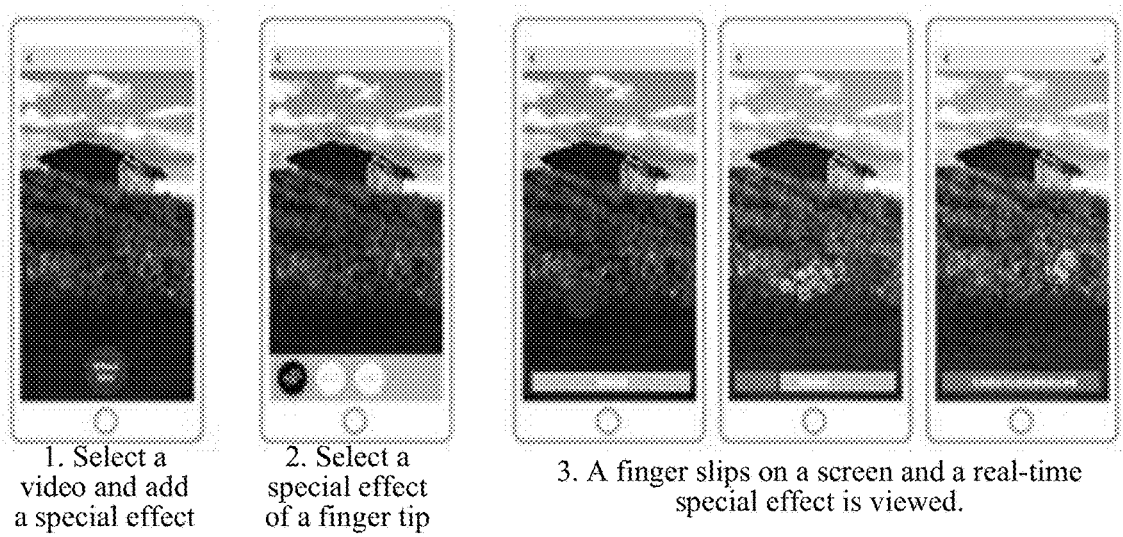
FIG. 8A is a schematic view of displaying a light painting special effect according to an embodiment of the present disclosure.
Figure 8B:
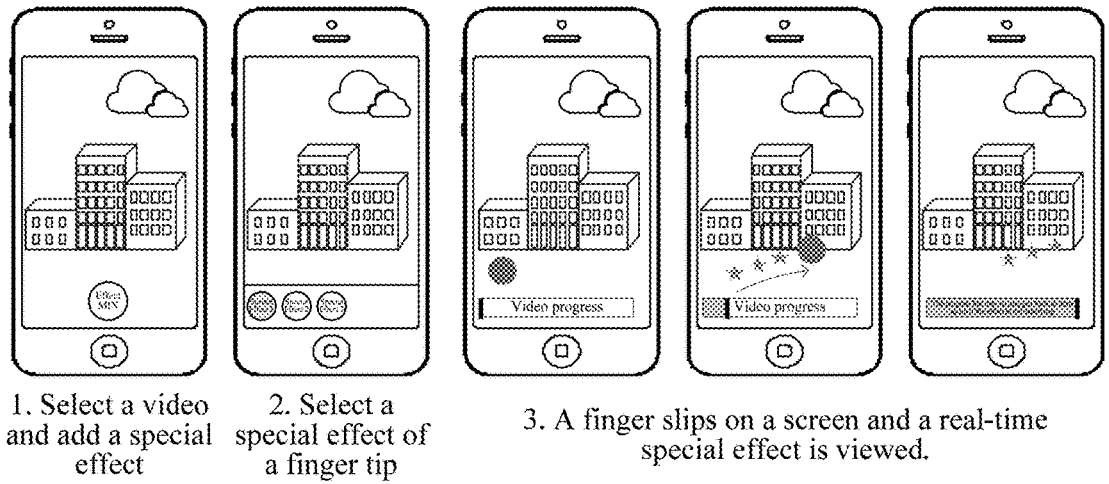
FIG. 8B is a schematic view of displaying a light painting special effect according to an embodiment of the present disclosure.

Scene 1) is shown in FIGS. 8A and 8B, a user may set a trace of a drawn light painting special effect at a certain position in an image frame corresponding to a certain time point in a video, that is, the trace of the light painting special effect drawn by the user is bound with a specific position in the video and is also bound with an image frame corresponding to the time point of the video.

In scene 2), a user may select an effect of a different trace of a light painting special effect, for example, the effects include the following.

Figure 8C:
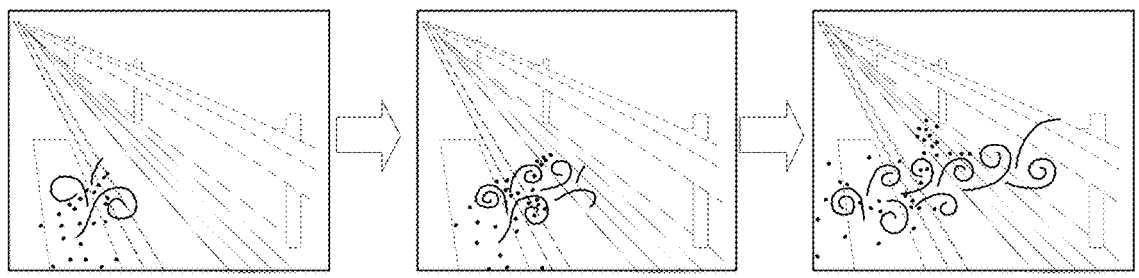
FIG. 8C is a schematic view of displaying a light painting special effect according to an embodiment of the present disclosure.
Figure 8D:
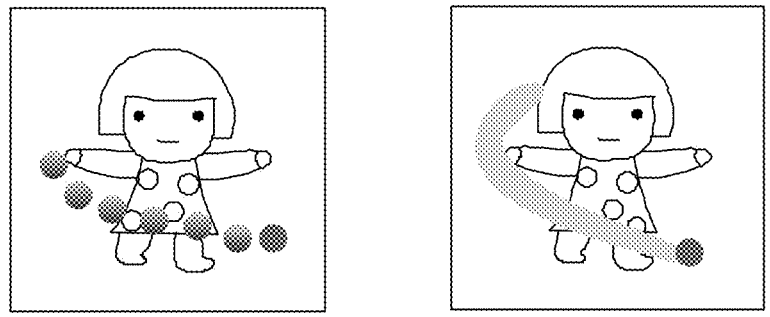
FIG. 8D is a schematic view of displaying a light painting special effect according to an embodiment of the present disclosure.

A) As shown in FIG. 8D, a visual appearance of a trace of a light painting special effect is different.

B) A disappearance duration of a trace of a light painting special effect is different.

Figure 8E:
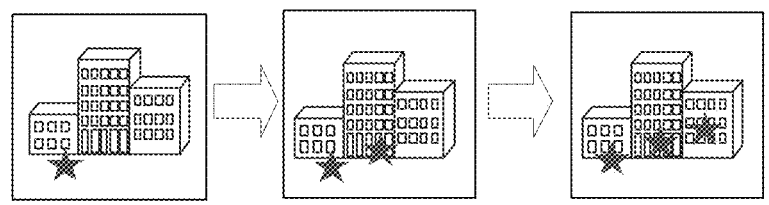
FIG. 8E is a schematic view of displaying a light painting special effect according to an embodiment of the present disclosure.

C) Particle disappearance animation of a light painting special effect is different, for example:
   i. Disappear gradually.
   ii. Disappear while changing into circles.
   iii. Disappear while being vaporized into water vapor.
   iv. As shown in FIGS. 8C and 8E, extension of trace of a light painting special effect.

Figure 8F:
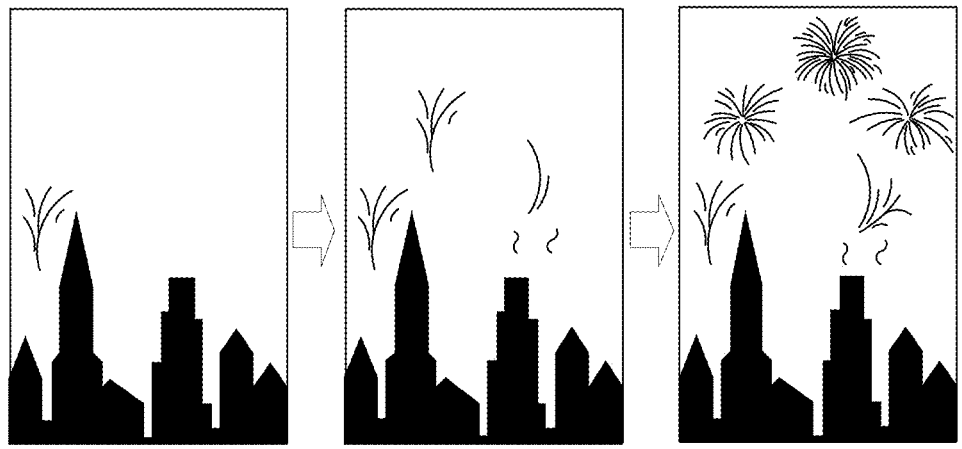
FIG. 8F is a schematic view of displaying a light painting special effect according to an embodiment of the present disclosure.

D) As shown in FIG. 8F, animation among multiple particles, for example, a single particle rises, and a particle disappears after explosion, can realize an effect of finger slipping.

Figure 8G:
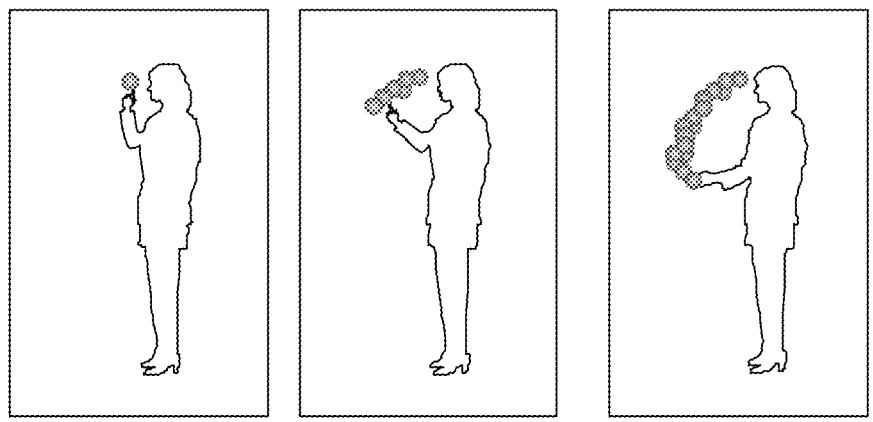
FIG. 8G is a schematic view of displaying a light painting special effect according to an embodiment of the present disclosure.

Scene 3): a light painting special effect and a specific action in a video are identified and combined.
   i. A moving position of a hand of a user in each image frame of a video may be identified automatically. A light painting special effect characterizing a moving trace of the hand is formed at a position of the hand in each image frame.
   ii. As shown in FIG. 8G, if a user prepares to draw a circle in the air, a position of a hand of the user in each image frame is identified automatically. According to a position of an arm of the user and a start position of the hand of the user in each image frame, a light painting special effect corresponding to a moving trace of the hand is formed.

Figure 8H:
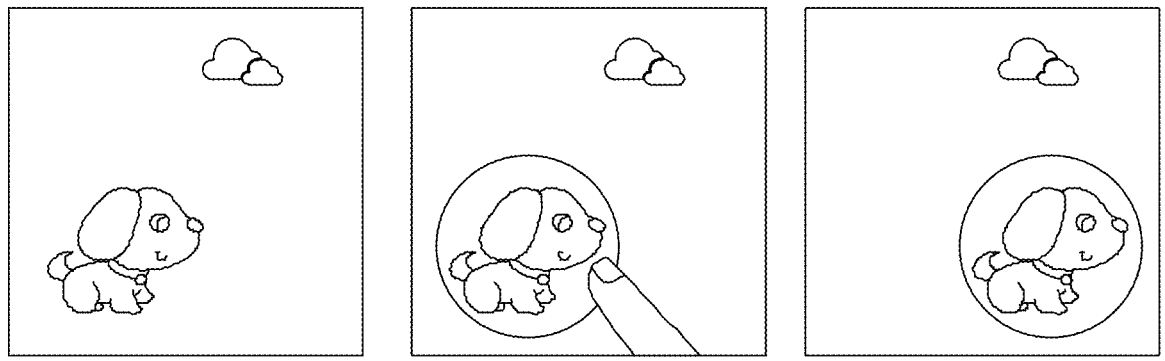
FIG. 8H is a schematic view of displaying a light painting special effect according to an embodiment of the present disclosure.

Scene 4): a light painting special effect and a specific object are tracked, identified, and combined.
   i. A trace of a light painting special effect added by a user is combined with an object in a current video frame of a video. If the object moves in the following image frame of the video, the trace of the light painting special effect also moves along with the object in the video.
   ii. As shown in FIG. 8H, if the user selects a dog in the current image frame of the video. The dog moves in a video collected afterwards. The trace of the light painting special effect in the following image frame moves with the dog.

Implementation of the light painting special effect is described. Implementation of the light painting special effect mainly includes four parts, that is, template protocol parsing, input processing, particle effect rendering, and video synthesizing, which will be described respectively with reference to FIGS. 8I and 8J.

I. Template Protocol Parsing

A light painting special effect is essentially formed by repeatedly mapping a single particle element for a large amount of times.

Each particle element is drawn on different positions of a screen with different sizes, colors, and rotation directions, to form a whole light painting special effect.

A single particle element may support the following attributes: emission angle; initial speed (x axis and y axis directions); gravitational acceleration speed (x axis and y axis directions); centripetal force/centrifugal force; tangential acceleration speed; autorotation speed; autorotation acceleration speed; initial size; ending size; initial color; ending color; color mixing method; life cycle; and a maximum quantity of particles.

Figure 8I:
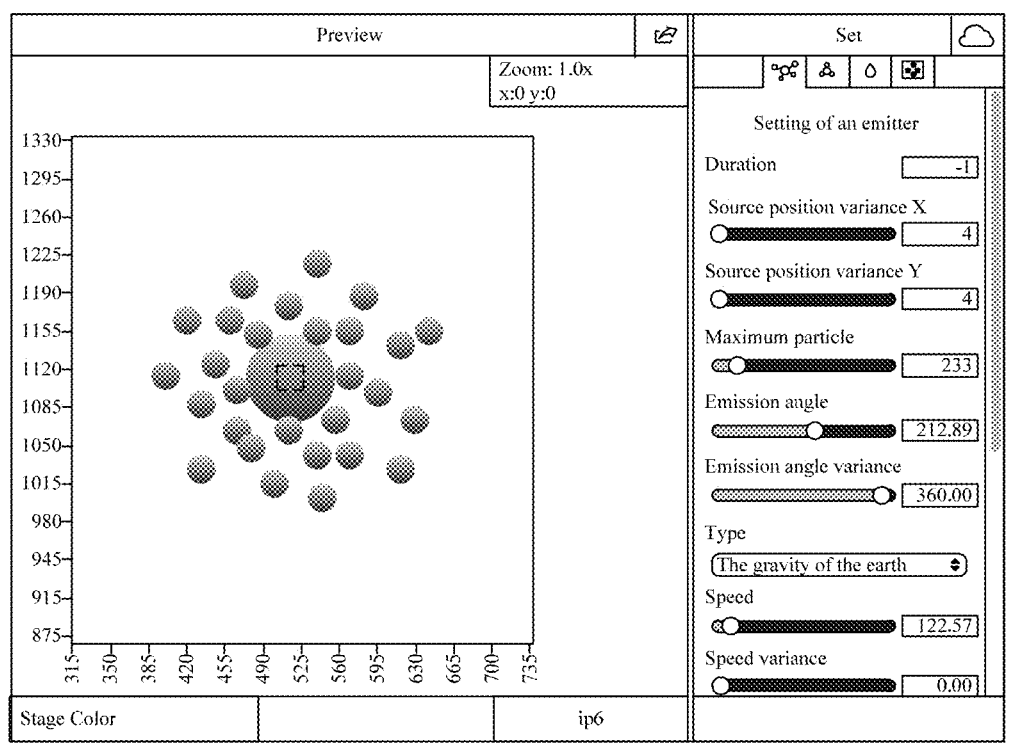
FIG. 8I is a schematic view of processing of drawing a special effect element based on a particle system according to an embodiment of the present disclosure.
Figure 8J:
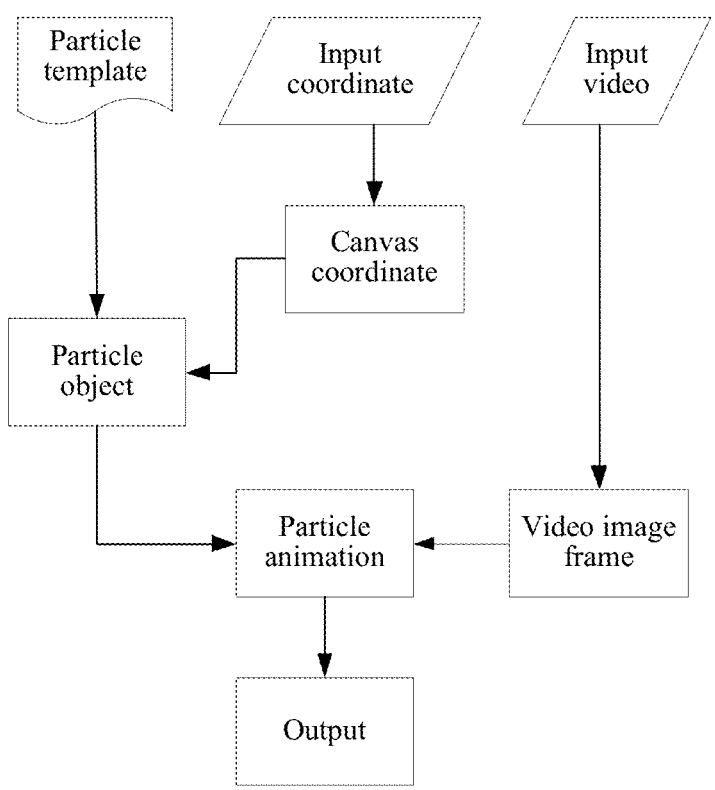
FIG. 8J is a schematic flowchart of forming a light painting special effect in an input video according to an embodiment of the present disclosure.

As shown in FIG. 8I, for an image frame in a video that needs a light painting special effect formed, attributes, such as size, color. Rotation direction of a particle (element) that is drawn on a blank canvas and is used to form the light painting special effect are required. Coordinates are computed, and a position of the particle is also computed. When the light painting special effect is formed in each image frame, the coordinates and a position of the particle are computed. When a particle corresponding to each image frame is presented continuously in corresponding image frames, the effect of moving the particle is realized.

II. Input Processing

The principle of implementing a light painting special effect in a video is: moving along with an input coordinate by using a particle emitter provided by a particle system (a tool provided by the particle system for a user to draw a particle), and forming a trace of a light painting special effect along with movement of the coordinates of the particle emitter.

As stated above, input herein may come from several different input resources:
  1. Position set by a user in a video, for example, a finger slips on a display interface that presents a video and coordinates are detected.
  2. A specific action of a certain character in the video is input for identification, for example, hand movement in each image frame of the video is identified to obtain coordinates.
  3. A position of a certain object in a video is input for tracking, for example, a small animal in the video is tracked to obtain coordinates.

Whatever the input source is, it is finally converted into an input coordinate (x, y), The coordinates are normalized according to the input coordinate (x, y) and a size (w, h) of an input image:

$x=x/w;$ $y=y/h;$

The normalized coordinate is then put in a canvas system to be converted into a canvas coordinate:

$x=x*$ canvasWidth; $y=y*$ canvasHeight.

Finally, a position of the particle emitter on the canvas is adjusted according to the canvas coordinate. A particle is drawn on the canvas through the particle emitter.

III. Particle Effect Rendering

An OpenGL image operation interface provided by the particle system is mainly used for rendering, for example, it is assumed that each second is divided into 30 frames, each frame is processed by the following steps: clearing a canvas and loading particle element texture, and loading computed relevant attributes of a particle element, such as a vertex coordinate and a color; setting a color mixing mode specified by a template; and invoking a drawing interface to draw particles on the canvas.

IV. Video Synthesizing

For an image frame in a video that needs a light painting special effect formed, the corresponding image frame is filled into a canvas that has particles drawn for a corresponding image frame as a background of the canvas, to realize an effect of synthesizing the particle of the light painting special effect and a corresponding image frame. The synthesized canvas frame is encoded and stored as a video file.

The video file may be played at a local terminal at a user side or uploaded to a social network platform to share with other users.

Figure 9:
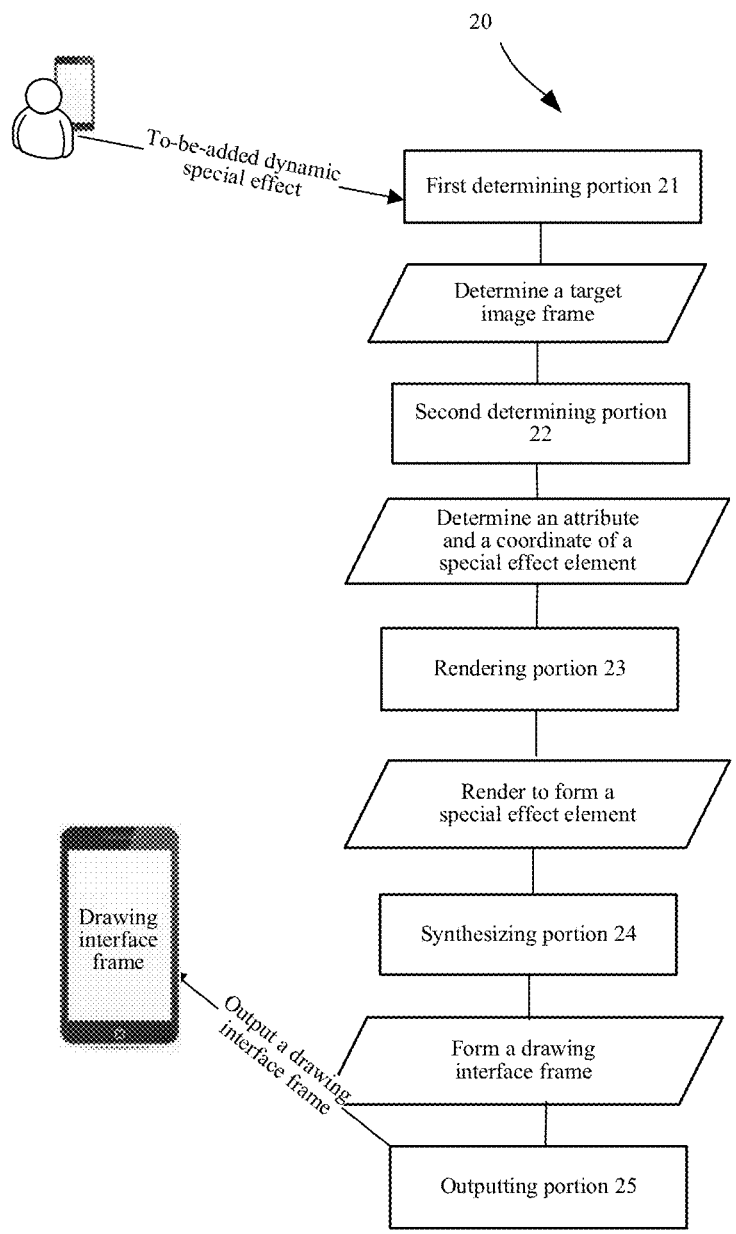
FIG. 9 is a schematic structural diagram of a video processing device according an embodiment of the present disclosure.

A functional structure of the foregoing video processing device is described, and referring to a schematic view of a functional structure of the video processing device 20 in FIG. 9, the video processing device 20 includes: a first determining portion 21, configured to determine target image frames corresponding to a to-be-added dynamic special effect in a video; a second determining portion 22, configured to determine an attribute of a special effect element corresponding to the dynamic special effect in each of the target image frames and coordinates of the special effect element; a rendering portion 23, configured to render on a drawing interface based on the attribute and the coordinates of the special effect element, to form the special effect element; a synthesizing portion 24, configured to fill the target image frames into the drawing interface as a background of the drawing interface and forming drawing interface frames with the dynamic special effect; and an outputting portion 25, configured to output the drawing interface frames that are formed correspondingly for each of the target image frames.

In one embodiment, the first determining portion 21 is further configured to determine, based on a time period on a time axis of the video corresponding to a user operation, image frames corresponding to the time period in the video as the target image frame.

In one embodiment, the first determining portion 21 is further configured to identify a feature of each image frame in the video, and determine image frames identified to have a specific action feature as the target image frames.

In one embodiment, the first determining portion 21 is further configured to identify an object of each image frame in the video, and determine image frames identified to have a specific object as the target image frames.

In one embodiment, the second determining portion 22 is further configured to determine an attribute of a special effect element corresponding to each of the target image frames when a dynamic special effect following a trace of a touch operation of the user is added to the video, and determine coordinates of drawing the special effect element on the drawing interface based on a position of the touch operation of the user in the video.

In one embodiment, the second determining portion 22 is further configured to determine an attribute of a special effect element corresponding to each of the target image frames when a dynamic special effect following a trace of a specific action is added to the video, and determine coordinates of drawing the special effect element on the drawing interface based on a position of the specific action in each of the target image frames.

In one embodiment, the second determining portion 22 is further configured to determine an attribute of a special effect element corresponding to each of the target image frames when a dynamic special effect following an outline of a specific object is added to the video, and determine coordinates of drawing the special effect element on the drawing interface based on a position of the specific object in each of the target image frames.

In one embodiment, the second determining portion 22 is further configured to determine a visual effect correspondingly formed in each of the target image frames based on the dynamic special effect, and determine a special effect element that needs to be formed by rendering in a corresponding target image frame and a corresponding attribute when a corresponding visual effect is formed in each of the target image frames.

In one embodiment, the rendering portion 23 is further configured to normalize the coordinates of the special effect element based on a size of the target image frames, to form a normalized coordinate and render a position corresponding to the normalized coordinate of the special effect element on a blank drawing interface with a black background, to form the special effect element with a corresponding attribute.

In one embodiment, the synthesizing portion 24 is further configured to perform video encoding on a non-target image frame in the video and each of the drawing interface frames that are outputted in a time sequence to form a video file with the dynamic special effect.

An embodiment of the present disclosure further provides a video processing device, including: a processor and a memory for storing a computer program that can run in the processor.

The processor is configured to perform following steps when executing the computer program: determining target image frames corresponding to a to-be-added dynamic special effect in a video; determining an attribute of a special effect element corresponding to the dynamic special effect in each of the target image frames and coordinates of the special effect element; rendering the special effect element on a drawing interface based on the attribute and the coordinates of the special effect element; filling the target image frames into the drawing interface as a background of the drawing interface and forming drawing interface frames with the dynamic special effect; and outputting the drawing interface frames that are formed correspondingly for each of the target image frames.

The processor is further configured to perform the following step when executing the computer program: determining, based on a time period on a time axis of the video corresponding to a user operation, image frames corresponding to the time period in the video as the target image frame.

The processor is further configured to perform following steps when executing the computer program: identifying a feature of each image frame in the video, and determining image frames identified to have a specific action feature as the target image frames.

The processor is further configured to perform following steps when executing the computer program: identifying an object of each image frame in the video, and determining image frames identified to have a specific object as the target image frames.

The processor is further configured to perform following steps when executing the computer program: determining an attribute of a special effect element corresponding to each of the target image frames when a dynamic special effect following a trace of a touch operation of the user is added to the video, and determining coordinates of drawing the special effect element on the drawing interface based on a position of the touch operation of the user in the video.

The processor is further configured to perform following steps when executing the computer program: determining an attribute of a special effect element corresponding to each of the target image frames when a dynamic special effect following a trace of a specific action is added to the video, and determining coordinates of drawing the special effect element on the drawing interface based on a position of the specific action in each of the target image frames.

The processor is further configured to perform following steps when executing the computer program: determining an attribute of a special effect element corresponding to each of the target image frames when a dynamic special effect following an outline of a specific object is added to the video, and determining coordinates of drawing the special effect element on the drawing interface based on a position of the specific object in each of the target image frames.

The processor is further configured to perform following steps when executing the computer program: determining a visual effect correspondingly formed in each of the target image frames based on the dynamic special effect, and determining a special effect element that needs to be formed by rendering in a corresponding target image frame and a corresponding attribute when a corresponding visual effect is formed in each of the target image frames.

The processor is further configured to perform following steps when executing the computer program: normalizing the coordinates of the special effect element based on a size of the target image frames, to form a normalized coordinate and rendering a position corresponding to the normalized coordinate of the special effect element on a blank drawing interface with a black background, to form the special effect element with a corresponding attribute.

The processor is further configured to perform the following step when executing the computer program: performing video encoding on a non-target image frame in the video and each of the drawing interface frames that are outputted in a time sequence to form a video file with the dynamic special effect.

An embodiment of the present disclosure further provides a computer storage medium, the computer storage medium stores a computer program, and the computer program is configured to perform following steps when being executed by the processor: determining target image frames corresponding to a to-be-added dynamic special effect in a video; determining an attribute of a special effect element corresponding to the dynamic special effect in each of the target image frames and coordinates of the special effect element; rendering the special effect element on a drawing interface based on the attribute and the coordinates of the special effect element; filling the target image frames into the drawing interface as a background of the drawing interface and forming drawing interface frames with the dynamic special effect; and outputting the drawing interface frames that are formed correspondingly for each of the target image frames.

The computer program is further configured to perform the following step when being executed by the processor: determining, based on a time period on a time axis of the video corresponding to a user operation, image frames corresponding to the time period in the video as the target image frame.

The computer program is further configured to perform the following step when being executed by the processor: identifying a feature of each image frame in the video, and determining image frames identified to have a specific action feature as the target image frames.

The computer program is further configured to perform following steps when being executed by the processor: identifying an object of each image frame in the video, and determining image frames identified to have a specific object as the target image frames.

The computer program is further configured to perform following steps when being executed by the processor: determining an attribute of a special effect element corresponding to each of the target image frames when a dynamic special effect following a trace of a touch operation of the user is added to the video, and determining coordinates of drawing the special effect element on the drawing interface based on a position of the touch operation of the user in the video.

The computer program is further configured to perform following steps when being executed by the processor: determining an attribute of a special effect element corresponding to each of the target image frames when a dynamic special effect following a trace of a specific action is added to the video, and determining coordinates of drawing the special effect element on the drawing interface based on a position of the specific action in each of the target image frames.

The computer program is further configured to perform following steps when being executed by the processor: determining an attribute of a special effect element corresponding to each of the target image frames when a dynamic special effect following an outline of a specific object is added to the video, and determining coordinates of drawing the special effect element on the drawing interface based on a position of the specific object in each of the target image frames.

The computer program is further configured to perform following steps when being executed by the processor: determining a visual effect correspondingly formed in each of the target image frames based on the dynamic special effect, and determining a special effect element that needs to be formed by rendering in a corresponding target image frame and a corresponding attribute when a corresponding visual effect is formed in each of the target image frames.

The computer program is further configured to perform following steps when being executed by the processor: normalizing the coordinates of the special effect element based on a size of the target image frames, to form a normalized coordinate, and rendering a position corresponding to the normalized coordinate of the special effect element on a blank drawing interface with a black background, to form the special effect element with a corresponding attribute.

The computer program is further configured to perform the following step when being executed by the processor: performing video encoding on a non-target image frame in the video and each of the drawing interface frames that are outputted in a time sequence to form a video file with the dynamic special effect.

In view of the above, the embodiments of the present disclosure have many beneficial effects.

Embodiments consistent with the present disclosure deliver the effect of combining time, a position, and a dynamic special effect such as a light painting special effect in a video. The dynamic special element is realized at a specific position of each image frame of a specific clip of the video when the video is played to the specific clip, so that a viewer of the video may pay attention to the specific clip of the video and the specific position in the video clip.

Embodiments consistent with the present disclosure deliver the effect of combining action identification and a dynamic special effect such as a light painting special effect. The dynamic special effect is formed by following a trace of a specific action, so that a viewer of the video may pay attention to the specific action in the video.

Embodiments consistent with the present disclosure deliver the effect of combining an object (for example, an article) tracking and a dynamic special effect such as a light painting special effect. The dynamic special effect corresponding to an outline of a specific object is formed by following movement of the specific object, so that a viewer of the video may pay attention to the specific object in the video.

A person skilled in the art could understand that, all or partial steps for implementing the embodiments of the method may be implemented by hardware associated with program instructions, the program may be stored in a computer readable storage medium, when the program is executed, the program performs the steps including the embodiments of the method. The storage medium includes various media that can store program code, such as a mobile storage device, a Random Access Memory (RAM), a Read-Only Memory (ROM), a magnetic disk or an optical disk.

A portion in the present disclosure may be realized in the form of a software functional module or sold or used as an independent product, the portion may also be stored in a computer readable storage medium. In the present disclosure, a functional module or a functional portion may refer to one or more computer programs stored in one or more computer readable media. When executed by a processor, the computer programs may implement the corresponding functions of the functional module or functional portion. Further, a functional module or a functional portion may include a hardware component and one or more computer programs stored in one or more computer readable media. When executed by a processor, the hardware component and the computer programs may implement the corresponding functions of the functional module or functional portion.

Based on such understanding, the technical solution in the present disclosure essentially or the part that makes contributions to the relevant technology may be embodied in the form of a software product, the computer software product is stored in a storage medium and includes several instructions for enabling a computer device (that may be a personal computer, a server or a network device) to perform the whole or a part of the method in each embodiment of the present disclosure. The foregoing storage medium may be various media that can store program code, such as a mobile storage device, a RAM, a ROM, a magnetic disk, or an optical disk.

The foregoing descriptions are merely specific embodiments of the present disclosure, but do not intend to limit the protection scope of the present disclosure. Any change or replacement that could be easily conceived of by a person skilled in the art within the technical scope of the disclosure shall fall in the protection scope of the present disclosure. Therefore, the protection scope of the present disclosure shall depend on the protection scope of the claims.

INDUSTRIAL APPLICABILITY

Embodiments of the present disclosure includes determining target image frames corresponding to a to-be-added dynamic special effect in a video; determining an attribute of a special effect element corresponding to the dynamic special effect in each of the target image frames and coordinates of the special effect element; rendering the special effect element on a drawing interface based on the attribute and the coordinates of the special effect element; filling the target image frames into the drawing interface as a background of the drawing interface and forming drawing interface frames with the dynamic special effect; and outputting the drawing interface frames that are formed correspondingly for each of the target image frames. A method of determining target video frames for which a dynamic special effect needs to be formed in a video is provided to easily determine a video frame corresponding to a clip or a specific object in a video as a target video frame, thereby provide capability to customize a dynamic special effect in the video according to demand. For the audience of a video, regardless of a time point of a video at which the video is being viewed, since the eye-catching duration of a dynamic special effect is far longer than a static effect formed by a graphic layer drawn in the video, embodiments of the present disclosure enhance users ability to identify a clip or object that needs to be highlighted by the video presenter, which improves user experience of video sharing.

What is claimed is:

1. A video processing method, comprising:
   determining, by a computing device, target image frames corresponding to a dynamic special effect in a video, the target image frames including a first and a second target image frames;
   determining, by the computing device, an attribute and coordinates of a first special effect element corresponding to the dynamic special effect in the first target image frame, and determining, by the computing device, an attribute and coordinates of a second special effect element corresponding to the dynamic special effect in the second target image frame;
   rendering, by the computing device, the first special effect element on a drawing interface based on the attribute and the coordinates of the first special effect element, and forming, by the computing device, a first drawing interface frame with the dynamic special effect by filling the first image frame into the drawing interface as a background;
   after forming the first drawing interface frame, clearing the drawing interface;
   after clearing the drawing interface, rendering, by the computing device, the second special effect element on the drawing interface based on the attribute and the coordinates of the second special effect element, and forming a second drawing interface frame with the dynamic special effect by filling the second target image frame into the drawing interface as a background; and
   outputting, by the computing device, the first and the second drawing interface frames respectively corresponding to the first and the second target image frames.

2. The method according to claim 1, further comprising:
   determining, by the computing device based on a time period of the video corresponding to an operation, image frames corresponding to the time period in the video as the target image frames.

3. The method according to claim 1, further comprising:
   identifying, by the computing device, a feature in the video; and
   determining, by the computing device, image frames identified as having the feature as the target image frames.

4. The method according to claim 1, further comprising:
   identifying, by the computing device, an object in the video; and
   determining, by the computing device, image frames identified as having the object as the target image frames.

5. The method according to claim 1, further comprising:
   determining, by the computing device, a position of a touch operation added to the video; and
   determining, by the computing device, the coordinates of the first or the second special effect element on the drawing interface based on the position of the touch operation in the video.

6. The method according to claim 1, further comprising:
   determining, by the computing device, a position of a specific action added to the video; and
   determining, by the computing device, the coordinates of the first or the second special effect element on the drawing interface based on the position of the specific action.

7. The method according to claim 1, further comprising:
   determining, by the computing device, a position of a specific object added to the video; and
   determining, by the computing device, the coordinates of the first or the second special effect element on the drawing interface based on the position of the specific object.

8. The method according to claim 1, further comprising:
   determining, by the computing device, a visual effect created in each of the target image frames based on the dynamic special effect; and
   determining, by the computing device, the first or the second special effect element further according to the visual effect.

9. The method according to claim 1, further comprising:
   normalizing, by the computing device, the coordinates of the first or the second special effect element respectively based on a size of the first or the second target image frame.

10. A video processing device, comprising: a memory; and a processor coupled to the memory and configured to:
    determine target image frames corresponding to a dynamic special effect in a video, the target image frames including a first and a second target image frames;
    determine an attribute and coordinates of a first special effect element corresponding to the dynamic special effect in the first target image frame, and determine an attribute and coordinates of a second special effect element corresponding to the dynamic special effect in the second target image frame;
    render on a drawing interface the first special effect element based on the attribute and the coordinates of the first special effect element, and form a first drawing interface frame with the dynamic special effect by filling the first image frame into the drawing interface as a background;
    after forming the first drawing interface frame, clear the drawing interface;
    after clearing the drawing interface, render the second special effect element on the drawing interface based on the attribute and the coordinates of the second special effect element, and form a second drawing interface frame with the dynamic special effect by filling the second target image frame into the drawing interface as a background; and
    output the first and the second drawing interface frames respectively corresponding to the first and the second target image frames.

11. The video processing device according to claim 10, wherein the processor is further configured to determine, based on a time period of the video corresponding to an operation, image frames corresponding to the time period in the video as the target image frames.

12. The video processing device according to claim 10, wherein the processor is further configured to identify a feature in the video, and determine image frames identified to have the feature as the target image frames.

13. The video processing device according to claim 10, wherein the processor is further configured to identify an object in the video, and determine image frames identified as having the object as the target image frames.

14. The video processing device according to claim 10, wherein the processor is further configured to determine a position of a touch operation added to the video, and determine the coordinates of the first or the second special effect element on the drawing interface based on the position of the touch operation.

15. The video processing device according to claim 10, wherein the processor is further configured to determine a position of a specific action added to the video, and determine the coordinates of the first or the second special effect element on the drawing interface based on the position of the specific action.

16. The video processing device according to claim 10, wherein the processor is further configured to determine a position of a specific object added to the video, and determine the coordinates of the first or the second special effect element on the drawing interface based on the position of the specific object.

17. The video processing device according to claim 10, wherein the processor is further configured to determine a visual effect correspondingly formed in each of the target image frames based on the dynamic special effect, and determine the first or the second special effect element further according to the visual effect.

18. The video processing device according to claim 10, wherein the processor is further configured to normalize the coordinates of the first or the second special effect element respectively based on a size of the first or the second target image frame.

19. A non-transitory computer-readable storage medium storing computer program instructions executable by at least one processor to perform:
  determining target image frames corresponding to a dynamic special effect in a video, the target image frames including a first and a second target image frames;
  determining an attribute and coordinates of a first special effect element corresponding to the dynamic special effect in the first target image frame, and determining an attribute and coordinates of a second special effect element corresponding to the dynamic special effect in the second target image frame;
  rendering the first special effect element on a drawing interface based on the attribute and the coordinates of the first special effect element, and forming, by the computing device, a first drawing interface frame with the dynamic special effect by filling the first image frame into the drawing interface as a background;
  after forming the first drawing interface frame, clearing the drawing interface;
  after clearing the drawing interface, rendering the second special effect element on the drawing interface based on the attribute and the coordinates of the second special effect element, and forming a second drawing interface frame with the dynamic special effect by filling the second target image frame into the drawing interface as a background; and
  outputting the first and the second drawing interface frames respectively corresponding to the first and the second target image frames.

20. The method according to claim 1, wherein the first and the second target image frames are positioned in the video between a first and a second non-target image frames, each of the first and the second non-target image frames being devoid of the dynamic special effect, the method further comprising:
  performing, by the computing device, video encoding in a time sequence the first non-target image frame, the first and the second drawing interface frames, and the second on-target image frame, to form a video file.

* * * * *